May 10, 1966  C. D. LESLIE  3,250,359
INDEX STOP FOR CONTROL LEVER
Filed April 20, 1964  2 Sheets-Sheet 2
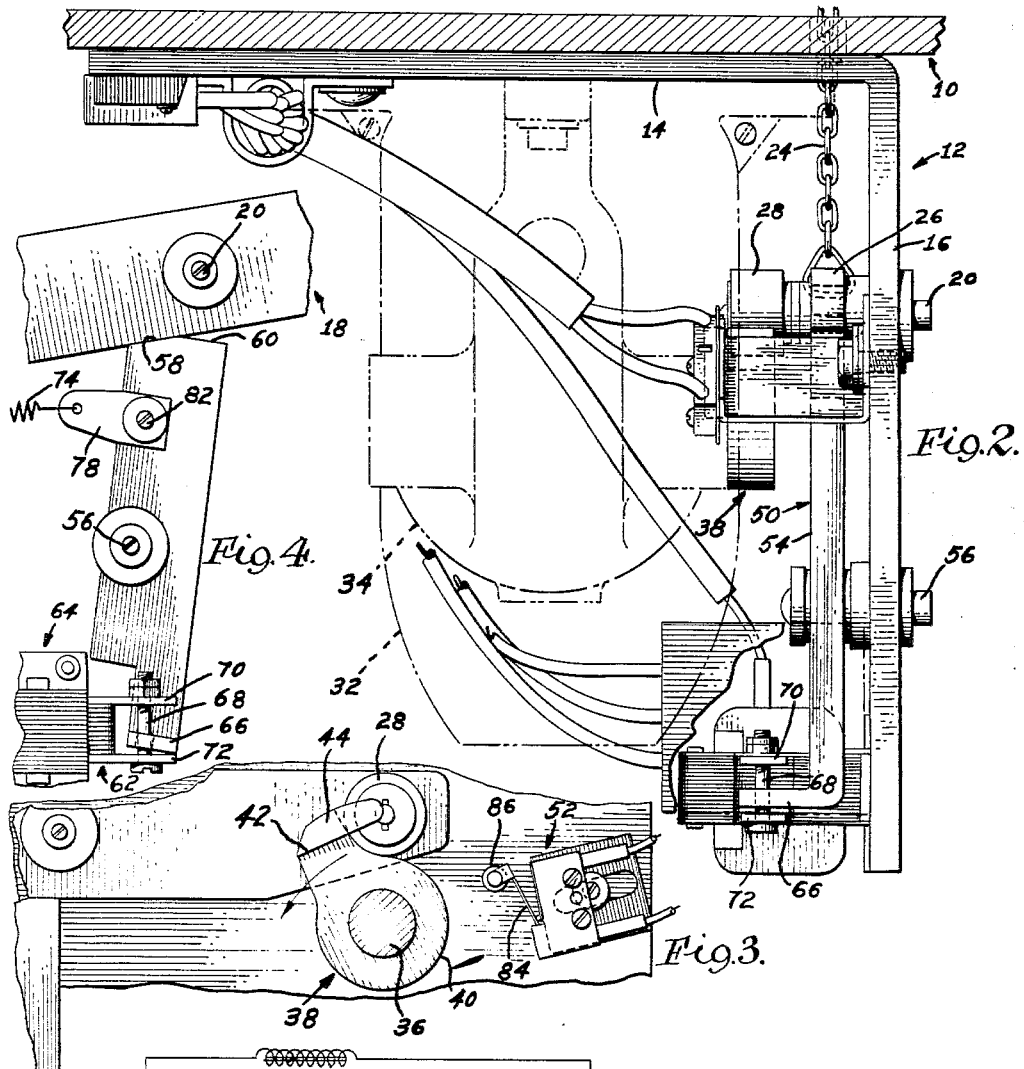
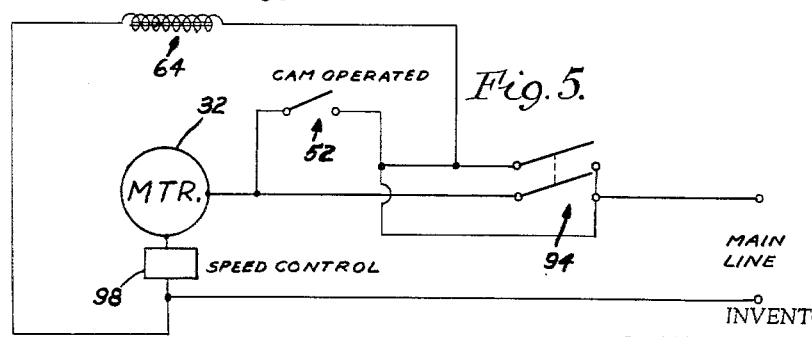
INVENTOR.
CHARLES D. LESLIE
BY
Bean, Brooks, Buckley & Bean
ATTORNEYS United States Patent Office 3,250,359
Patented May 10, 1966

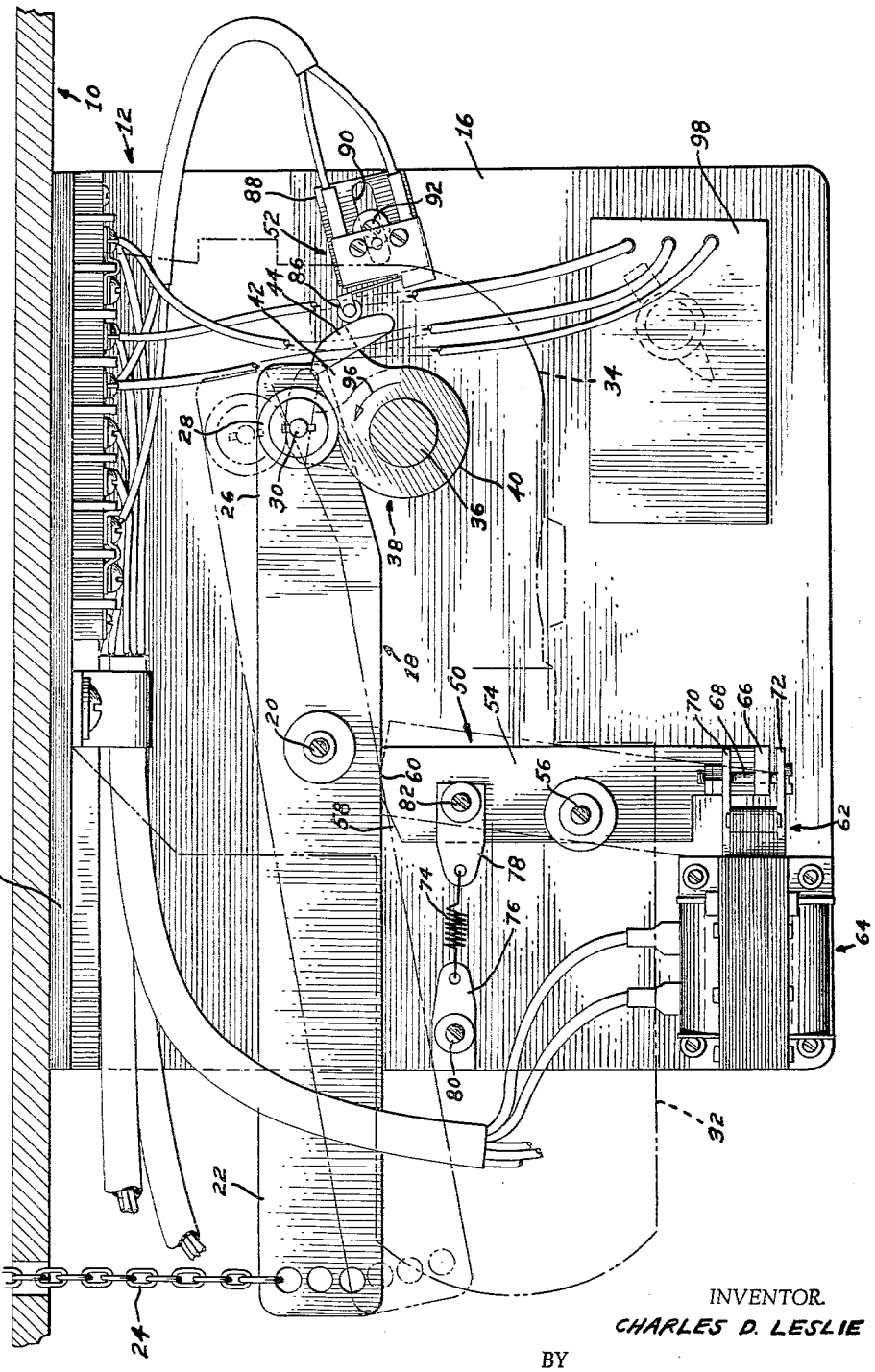
INVENTOR.
CHARLES D. LESLIE

3,250,359
INDEX STOP FOR CONTROL LEVER
Charles D. Leslie, Pittsford, N.Y., assignor to Speed Feed Machine Co., division of Cap-Roc, Inc., Rochester, N.Y.
Filed Apr. 20, 1964, Ser. No. 360,904
5 Claims. (Cl. 192—138)

This invention relates to actuator devices and pertains, more particularly, to a remotely controlled mechanical actuator which may be used in a system to supplant manual actuation.

In numerous mass production operations, the actuation of a machine or machine element is performed manually and although operators may develop great skill and speed in the manipulation thereof, repetitive and constant usage during a normal working shift obviously introduces a fatigue factor which could be eliminated if the muscle load could be materially reduced as by providing a remotely controlled mechanical actuator for performing the same task. It is to this end that the present invention is directed. However, the very nature of the problem dictates that certain requirements be met which may be antagonistic to the successful solution to the problem. For example, the time delay between the performance of the remote controlling action and the actual operation of the device should be minimized so as not to slow down the operator's normal rate of production. At the same time, the device should be of such simple and efficient nature that it may perform its function repetitively a great number of times without the probability of requiring any substantial degree of maintenance or adjustment which, too, would operate to reduce the operator's normal rate of production. Still further, the problem is augmented by the fact that the mechanism should be capable of cyclic or continuously repetitive action which may be varied as to frequency to accommodate for the differences in skills of different workers, ranging from a beginner to the most highly skilled operator. It is of primary concern in connection with the present invention to fulfill all of the above requirements and to do so by means of a mechanism which is, at the same time, of economical construction.

A further object of this invention is to provide a remotely controlled actuator device which consists essentially of a pivoted lever imparted of rocking motion by a cam and which may be operated either for a single cycle or for successive cycles of operation at the will of the operator with provision being made for indexing the cam mechanism at the termination of each operation in such position that a minimum of delay time will be experienced between the next actuation of the remote control and the actual operation of the device.

Still another object of this invention resides in the combination, in an actuator device, of a pivoted lever operated by cam means in which a locking bar cooperates with switch means actuated by the cam means to effect indexing of the cam means for minimizing response time of the mechanism.

Other objects and advantages of the invention will appear from the description hereinbelow and the accompanying drawing wherein:

FIG. 1 is an elevational view of the actuator device constructed in accordance with this invention, the motor and gear head assembly being illustrated in phantom lines for the purpose of clarity;

FIG. 2 is an end view of the assembly shown in FIG. 1;

FIG. 3 is a partial section illustrating the cam and its association with the lever and the control switch after initiation of a cycle of operation;

FIG. 4 is a view illustrating the disposition of the locking bar during operation of the lever; and FIG. 5 is a diagrammatic view illustrating the circuitry involved in association with the present invention.

With reference at this time more particularly to FIGS. 1 and 2, the reference numeral 10 therein indicates in general the bed or table of a machine to be controlled in association with the actuator member described herein. A support frame indicated generally by the reference character 12 is secured, in the particular case shown, to the underside of the table 10 and includes a horizontal leg portion 14 and a vertically depending leg portion 16, the latter of which serves to mount, as is shown best in FIG. 1, an actuating lever assembly indicated generally by the reference character 18. For this purpose, the actuating lever 18 is pivotally mounted to the vertical leg 16 by means of a pivot bolt or suitable equivalent assembly 20 which may take any convenient or desired form. The free end 22 of the lever 18 is connected, in the specific instance shown, to a chain member 24 which will serve to actuate the associated mechanism mounted on the table 10. A specific application of the mechanism herein disclosed may be associated with a conventional button sewing machine in which the chain 24 is normally connected to a treadle manually depressed by the operator to manipulate the associated clutches and the like of the button sewing machine to initiate a sewing cycle of the machine. Such a button sweing machine can be manipulated, by a skilled operator, to effect the sewing of as many as 14,500 buttons in an eight hour shift. The force required, at the treadle, to actuate such machines will be in the order of 17–25 pounds. From this, it will be readily apparent that the physical operation of depressing the treadle for tensioning the chain 24 and operating the mechanism to which it is attached may introduce a considerable fatigue factor insofar as the machine operator is concerned. As will hereinafter be more particularly pointed out, according to the present invention, the lever 18 is caused to rock about the pivot 20 under control of the operator, requiring only that the operator depress a suitable foot switch for initiating such operation.

The opposite end 26 of the lever 18 mounts a cam roller 28, the same being pivotally mounted on the end portion 26 of the lever 18 by means of a suitable stub shaft or the like 30. Mounted on the underside of the horizontal arm 14 of the support frame or otherwise suitably secured to the frame assembly of the device is a motor 32 and an associated gear reduction head 34 which, for the purpose of clarity, are shown in dotted lines in FIGS. 1 and 2. This motor-gear reduction head assembly may be of any conventional construction or form such as are readily available as for example, in a combined unit. Projecting from the gear reduction head is a drive shaft 36 and cam means 38 is mounted on this drive shaft for cooperation with the cam roller 28 on the lever 18 to rock the lever about its associated pivot 20, as aforesaid. The cam means includes a cam proper having a heel portion 40 concentric with the axis of the drive shaft 36 and a cam nose portion 42 which operates to engage the cam roller 28 and rock the lever 18 to the dotted line position shown in FIG. 1. In the specific embodiment shown, there may be also provided an additional cam element 44 which does not contact the roller 28 but which operates an associated switch as hereinafter described more fully.

Of primary importance in connection with the present invention is the provision of means for indexing the drive shaft 36 and its associated cam means 38 so that at the end of each actuation cycle, the cam means may be so positioned that the toe portion 42 of the cam is in position to immediately initiate another rocking action of the lever 18 as soon as the drive shaft 36 starts to rotate. In this fashion, response time of the assembly is minimized and lost motion of the component parts is largely obviated. The particular manner in which this is accomplished is by the combination of the locking bar assembly indicated generally by the reference character 50 and the switch mechanism indicated generally by the reference character 52, the latter of which is actuated by the aforementioned auxiliary cam nose portion 44. The locking bar consists of a lever 54 pivoted as at 56 to the support frame and having an upper end provided with a sloping portion 58 and a flat nose portion 60, see particularly FIG. 4. In the position of the components as shown in FIG. 1, the flat nose portion 60 of the locking bar is positioned on the far side of the pivot 20 for the lever 18 from the cam roller 28 so that, in effect, the lever 54 blocks any rocking action of the lever 18 and thus, in effect forms a brake or lock for the component parts in this position. The lower end of the lever 54 is provided with suitable means for connection to the armature 62 of a solenoid device indicated generally by the reference character 64. In the specific instance shown, see particularly FIG. 2, the lower end of the lever 54 is provided with a laterally projecting ear 66 apertured to receive a screw-threaded connector member 68 carried by the spaced plate portions 70 and 72 which may form a part of or otherwise suitably secured to the armature 62. When the solenoid 64 is actuated, the armature 62 thereof moves to the left in FIG. 1 and moves the lever 54 to the dash-dot line position for this lever as is shown in FIG. 1, thus clearing the lever 18 of blocking action as normally affected by the lever 54, allowing the sloped end portion 58 to permit the lever to rock as is shown most clearly in FIG. 4.

In order to assure that the locking bar 50 is disposed properly relative to the actuating lever 18 when the solenoid 64 is denergized, a suitable spring means such as the tension spring 74 may be provided, the same being shown in FIG. 1 as being connected at its opposite ends to the tab elements 76 and 78 secured respectively, as by fasteners 80 and 82, to the support frame and to the locking bar 50.

The switch 52 includes an arm 84 having a cam roller or follower 86 thereon which is adapted to be engaged by the cam portion 44 previously described. The switch 52, as will hereinafter be more particularly described, is normally closed except when the cam portion 44 engages the roller 86 and moves the arm 84 to switch open position. The switch includes a mounting tab portion 88 provided with an elongate slot such as that shown at 90 for cooperation with a fastening element 92 so that the switch may be adjusted both radially inwardly and outwardly relative to the cam element 44 and in a circumferential direction relative thereto. The switch 52 is adapted to interrupt the power to the motor 32 when such switch is open, provided that the attendant operated foot switch is not closed, as will hereinafter be more particularly pointed out. Thus, it will be apparent that the switch 52 will be opened at some time prior to the rotational attainment of the drive shaft 36 to its index position as shown in FIG. 1 so that the drive shaft and associated cam means 38 will be coasting prior to engagement of the cam in the index position as aforesaid. This coasting action together with the blocking action of the locking bar 50 will serve to permit the cam to attain the index position thereof without undue shock or loading on the component parts of the mechanism, and especially on the gear train within the gear reduction head portion 34 of the assemblage. It is for this reason that the switch 52 is permitted of circumferential adjustment relative to the cam 44, i.e. the switch may be disposed to be actuated earlier or later with respect to the index position of the cam as may be necessitated by a particular operating condition of the device.

With reference now to FIG. 5, the foot switch which is under control of the operator is indicated generally therein by the reference character 94 and it will be seen that whenever this switch is closed as by momentary depression of an associated foot treadle, the motor 32 and the solenoid 64 will simultaneously be energized. This action will cause the locking bar 50 to be moved to the dash-dot line position shown in FIG. 1 to permit rocking of the lever 18 and, at the same time, the drive shaft 36 will rotate in the direction of the arrow 96 in FIG. 1 to immediately cause rocking action of the lever 18. During operation, the operator will immediately release the foot switch but in the interim, the cam portion 44 has ridden past the follower 86 and the switch 52 is closed so as to maintain a closed condition to the motor 32 although, as soon as the foot switch 94 is released, the solenoid 64 will be deenergized, thus permitting the spring 74 to return the locking bar to the full line position shown in FIG. 1 whenever the rocking motion of the lever 18 has been completed.

Thus, the motor 32 will continue to operate until the switch 52 is opened by the cam 54, whereafter the drive shaft 36 and associated cam 38 will coast as aforesaid until reaching the index position wherein further motion is blocked by the blocking bar 50. Additionally, the control conduit for the assembly preferably includes a speed control 98 which establishes the speed of operation of the motor 32. This is desirable since repetitive cycles may be called for in which case the operator merely maintains the foot switch 94 depressed for a sufficiently long period so as to achieve the requisite number of actuating cycles. It is obvious that the frequency of actuations which may occur during such cycles of successive actuations will be less for an unskilled operator than that which a skilled operator can utilize and, for this reason, the speed control 98 is provided. Thus, the speed control will accommodate for any particular operator, taking into account the operator skill involved, the switch 52 being correspondingly adjusted, as may be required. In any case, it is imperative that the switch 52 be adjusted or alternatively that the cam portion 44 be so provided as to interrupt power to the motor 32, during single cycle operation so as to assure attainment of the proper indexed position of the cam whenever a single cycle or a succession of cycles is terminated.

It is to be understood that certain changes and modifications as illustrated and described may be made without departing from the spirit of the invention or the scope of the following claims.

I claim:
1. A remotely controlled actuator device comprising, in combination,
   a support frame,
   an actuating lever pivotally mounted on said frame,
   a drive assembly mounted on said frame and including a drive shaft,
   cam means on said drive shaft for rocking said lever about its pivot in response to rotation of said drive shaft,
   means for indexing said drive shaft to a position in which said cam means is at the initiation of lever rocking action, such means including a locking bar normally engaging said lever for blocking rotation of said drive shaft beyond the indexed position thereof, and a control switch actuated by said cam means for interrupting power to said drive assembly prior to disposition of said drive shaft in said indexed position thereof,
   mechanism for moving said locking bar out of blocking engagement with said actuating lever,
   and an operator-controlled switch for simultaneously energizing said mechanism and said drive assembly.

2. The combination as defined in claim 1 wherein said control switch is adjustable circumferentially with respect to said cam means.

3. A remotely controlled actuator device comprising, in combination,
   a support frame,
   an actuating lever pivotally mounted on said frame, a rotatable cam assembly for rocking said actuating lever, drive means for rotating said cam assembly, a switch for selectively energizing said drive means, and control means for indexing said cam assembly in position to initiate actuating lever rocking action subsequent to deenergization of said drive means by said switch, such control means including a control switch in parallel with the first mentioned switch relative to said drive means, said control switch being actuated by said cam assembly to deenergize said drive means prior to the indexed position of said cam assembly whenever said first switch is open, and mechanism for blocking said actuating lever in response to open condition of said first switch.

4. The combination as defined in claim 3 wherein said control switch is adjustable circumferentially with respect to said cam means.

5. The combination as defined in claim 3 wherein said mechanism comprises a blocking lever pivoted on said frame for movement into and out of blocking position with respect to said actuating lever, and a solenoid energized in response to closing of said first switch to move said blocking lever out of the aforesaid blocking position.

No references cited.

DAVID J. WILLIAMOWSKY, *Primary Examiner.*